US008737294B2

(12) United States Patent
Chen

(10) Patent No.: US 8,737,294 B2
(45) Date of Patent: May 27, 2014

(54) APPARATUS AND METHOD FOR HANDLING RLC RETRANSMISSION FAILURE ACCORDING TO ACTIVATION STATUS OF SECURITY MODE

(75) Inventor: Teming Chen, San Diego, CA (US)

(73) Assignee: Via Telecom Co., Ltd., George Town, Grand Cayman (KY)

( * ) Notice: Subject to any disclaimer, the term of this patent is extended or adjusted under 35 U.S.C. 154(b) by 675 days.

(21) Appl. No.: 12/269,204

(22) Filed: Nov. 12, 2008

(65) Prior Publication Data

US 2010/0035599 A1    Feb. 11, 2010

Related U.S. Application Data

(60) Provisional application No. 61/087,966, filed on Aug. 11, 2008.

(51) Int. Cl.
    *H04W 4/00* (2009.01)
(52) U.S. Cl.
    USPC ........... 370/328; 370/331; 370/352; 370/401; 380/278
(58) Field of Classification Search
    USPC ........................................ 370/328
    See application file for complete search history.

(56) References Cited

U.S. PATENT DOCUMENTS

| 2005/0185609 A1* | 8/2005 | Malkamaki | 370/328 |
| 2007/0123216 A1* | 5/2007 | Cantini et al. | 455/411 |
| 2009/0025060 A1* | 1/2009 | Mukherjee et al. | 726/3 |

OTHER PUBLICATIONS

3GPP Technical Specification TS 36.331 V8.1.0 (Mar. 2008).*
3GPP Technical Specification TS 36.322 V8.2.0 (May 2008).*
Chinese language office action dated Apr. 19, 2011.
Evolved Universal Terrestrial Radio Access (E-UTRA) Radio Resource Control (RRC); May 31, 2008; pp. 7-23.
Evolved Universal Terrestrial Radio Access (E-UTRA) Radio Link Control (RLC) protocol specification; May 31, 2008; pp. 19-23.

* cited by examiner

*Primary Examiner* — Ayaz Sheikh
*Assistant Examiner* — Hai-Chang Hsiung
(74) *Attorney, Agent, or Firm* — McClure, Qualey & Rodack, LLP

(57) ABSTRACT

An apparatus and method for a radio resource control (RRC) protocol to re-establish connection in a mobile communication system environment are disclosed. A user equipment (UE), for performing connection re-establishment in a connected state with connection to a mobile communication system is provided. When a network problem occurs, the UE shall proceed with the RRC protocol connection re-establishment procedure if the security has been activated. However, if the security has not been activated and the Radio Link Control (RLC) protocol indicates the maximum number of re-transmission has been reached, the UE shall reset lower layers of the RRC protocol, release unnecessary radio resources, and indicate the release of the RRC protocol connection to upper layers of the RRC protocol. Then the UE enters the idle state and waits for the next trigger event.

20 Claims, 6 Drawing Sheets

APPARATUS AND METHOD FOR HANDLING RLC RETRANSMISSION FAILURE ACCORDING TO ACTIVATION STATUS OF SECURITY MODE

CROSS REFERENCE TO RELATED APPLICATIONS

This Application claims priority of U.S. Provisional Application No. 61/087,966, filed Aug. 11, 2008.

BACKGROUND OF THE INVENTION

1. Field of the Invention

The invention generally relates to connection re-establishment procedures and, more particularly, to an apparatus and method for a radio resource control (RRC) protocol to re-establish connection in a radio network system environment.

2. Description of the Related Art

A universal mobile telecommunications system (UMTS) is a third generation mobile communication system that has evolved from the Global System for Mobile communications (GSM) system. The UMTS is a European standard which aims to provide better mobile communication services based on the GSM core network and wideband code division multiple access (W-CDMA) technology. Although UMTS delivers high data transfer rates, wireless data usage is expected to increase significantly over the next few years. For this reason, concepts for UMTS Long Term Evolution (LTE) have been proposed and the objective is to further improve UMTS to achieve high-data-rates, low-latency and packet-optimized radio access technology. The improved UMTS is called Evolved Universal Terrestrial Radio Access (E-UTRA).

Consider a wireless mobile device, generally referred to as a user equipment (UE), which complies with the 3GPP specifications for the E-UTRA protocol. The 3GPP TS 36.331 specification, v.8.2.0, with the accepted change request R2-083795, referred to herein as the 36.331 specification, addresses the subject of the E-UTRA RRC (Radio Resource Control) protocol requirements between the E-UTRA Terrestrial Radio Access Network (E-UTRAN) and the UE.

In accordance with clause 5.3.7.2 of the 36.331 specification, the UE shall initiate the RRC protocol connection re-establishment procedure whenever the "Radio Link Control (RLC) protocol indicates that the maximum number of re-transmissions has been reached". It further recites that the UE shall only initiate the procedure when security has been activated. However, there may be a situation where the RRC protocol security mode has not yet been activated when the RLC protocol indicates that the maximum number of re-transmission has been reached.

The above situation is described in the 3GPP TS 36.322 specification, v.8.2.0. The RLC indicates that the maximum number of re-transmissions has been reached when the RB (radio bearer) is mapped on a RLC AM (acknowledged mode). However, the default configuration of the SRB1 (signaling radio bearer 1) is mapped on a RLC AM as specified in the 36.331 specification and the configuration messages for activating the RRC security mode are expected to be transmitted on the SRB1. Thus, the RRC security mode may not be activated when the RLC indicates that the maximum number of re-transmissions has been reached. This results in contradiction to the precondition that the UE can only initiate the RRC protocol connection re-establishment procedure when the RRC security mode has been activated, and may further cause the UE operational errors.

BRIEF SUMMARY OF THE INVENTION

Accordingly, an embodiment of the invention provides an apparatus and methods for a RRC protocol to re-establish connection in a mobile communication system environment. In one aspect of the invention, a UE, performing connection re-establishment in a connected state with connection to a mobile communication system, is provided. The UE comprises a wireless module, an event handler, and a controller. The wireless module receives and transmits messages. The event handler receives a trigger event which indicates that the transmission of an outward message has failed in a radio link control (RLC) protocol after a predetermined maximum number of re-transmission attempts has been reached. The controller determines whether the UE is in security mode in response to the trigger event. The controller may be arranged to perform enter-idle-state actions and move the UE state from the connected state to an idle state in response of that the UE is determined not in security mode. The controller may also be arranged to perform a RRC protocol connection re-establishment procedure in response of that the UE is determined in security mode.

The enter-idle-state actions comprise any combination of the following steps: resetting the lower layers of the RRC protocol, releasing unnecessary radio resources, indicating the release of the RRC protocol connection to the upper layers of the RRC protocol, and entering RRC_IDLE state.

The RRC protocol connection re-establishment procedure comprises any combination of the following steps: resetting the lower layers of the RRC protocol, selecting a suitable cell of the mobile communication system, and initiating transmission of a request message to the mobile communication system. The RRC protocol connection re-establishment procedure may further comprises receiving a response message in response to the request message. If the response message is a configuration message, the RRC protocol connection re-establishment procedure continues to reconfigure and resume signaling radio bearer communication, re-activate the security mode, and initiate transmission of a configuration complete message. If the response message is a rejection message, the RRC protocol connection re-establishment procedure continues to perform the enter-idle-state actions. Thus, the UE remains in the connected state if the RRC protocol connection re-establishment procedure is completed successfully; otherwise, the UE enters the idle state.

The mobile communication system may be an Evolved Universal Terrestrial Radio Access (E-UTRA) system.

In another embodiment of the invention, a method for performing connection re-establishment in a UE configured in a connected state with connection to a mobile communication system is provided. The method comprises receiving a trigger event which indicates that an outward message transmission in the RLC protocol has failed after a predetermined maximum number of re-transmission attempts has been reached, determining whether the UE is in security mode in response to the trigger event, and performing enter-idle-state actions and moving the UE state from the connected state to an idle state in response of that the user equipment is determined not in security mode. The method may further comprise performing a RRC protocol connection re-establishment procedure in response of that the UE is determined in security mode.

The enter-idle-state actions comprise any combination of the following steps: resetting the lower layers of the RRC protocol, releasing unnecessary radio resources, indicating the release of the RRC protocol connection to the upper layers of the RRC protocol, and entering a RRC_IDLE state.

The RRC protocol connection re-establishment procedure comprises any combination of the following steps: resetting the lower layers of the RRC protocol, selecting a suitable cell of the mobile communication system, and initiating transmission of a request message to the mobile communication system. The RRC protocol connection re-establishment procedure further comprises receiving a response message in response to the request message. If the response message is a configuration message, the RRC protocol connection re-establishment procedure continues to reconfigure and resume signaling radio bearer communication, re-activate the security mode, and initiate transmission of a configuration complete message. If the response message is a rejection message, the RRC connection re-establishment procedure continues to perform the enter-idle-state actions. Thus, the UE remains in the connected state in response of that the RRC protocol connection re-establishment procedure is completed successfully; otherwise, the UE enters the idle state.

The mobile communication system may be an E-UTRA system.

Other aspects and features of the present invention will become apparent to those ordinarily skilled in the art upon review of the following descriptions of specific embodiments of an apparatus and method for a RRC to re-establish connection in an E-UTRA system environment.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. In order to give better examples, the embodiments described below are utilized in E-UTRAN environments. In addition, 3GPP specifications could be used to teach the spirit of this invention but could not be used to limit the scope of the present invention.

Figure 1:
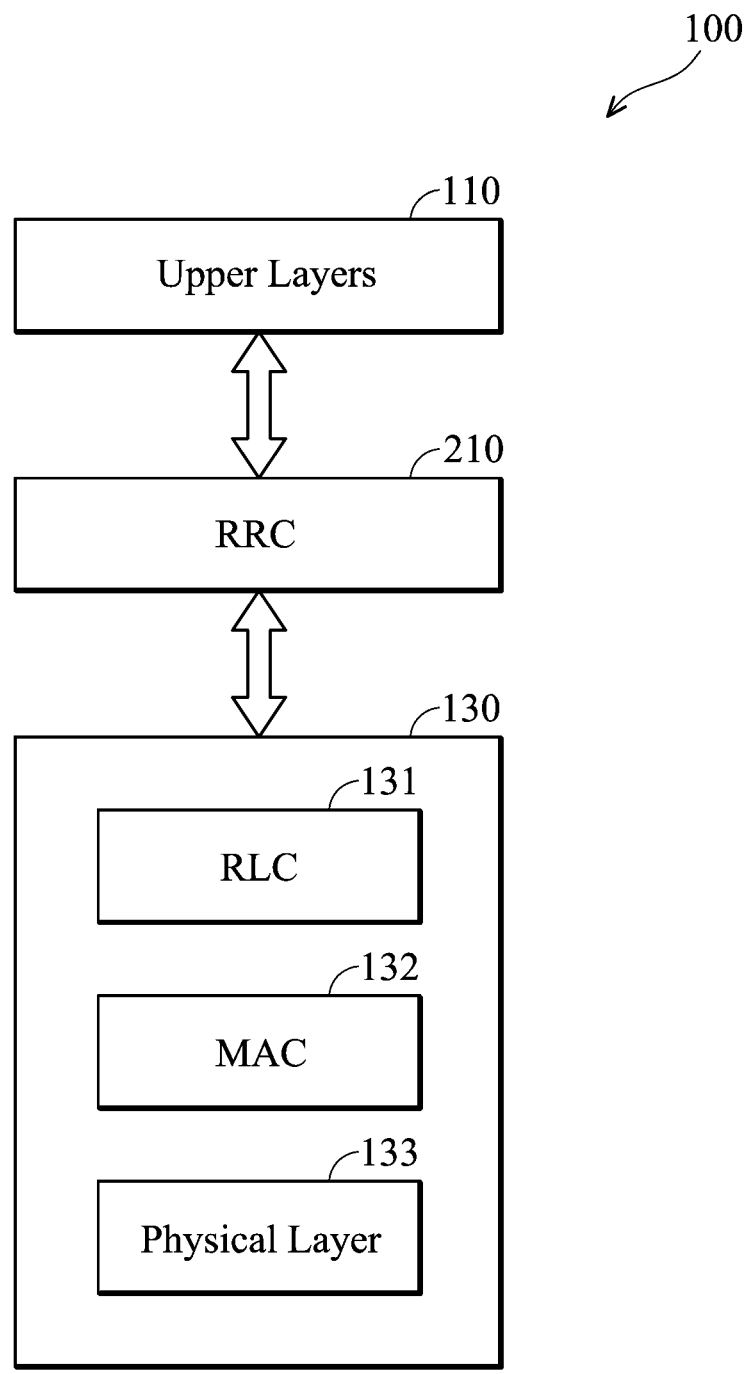
FIG. 1 is a block diagram illustrating a control-plane protocol stack apparatus having a RRC protocol block according to an embodiment of the invention.

FIG. 1 is a block diagram illustrating a control-plane protocol stack apparatus having a radio resource control (RRC) protocol block according to an embodiment of the invention. The RRC protocol stack 210 is a sub-layer of an E-UTRA UE protocol stack 100, and is responsible for providing information transfer services to the upper layers 110 and for controlling the configuration of the lower layers 130, including the radio link control (RLC) protocol 131, medium access control (MAC) protocol 132, and physical layer protocol 133. In real implementations, any of the protocol stacks referred in this specification could be realized by a combination of hardware and software.

In order to stay connected to an E-UTRAN, the UE will establish a connection after being powered on and maintain it. Whenever the RRC protocol stack 210 may detect a network problem, including any of radio link failure, handover failure, RLC re-transmission failure, and connection reconfiguration failure, it shall try to communicate again with the E-UTRAN and re-establish the connection. Nonetheless, in the conventional RRC protocol, the communication actions can only be performed under a precondition that the security mode has been activated and no action is defined for the security mode not having been activated. Advantageously, the RRC protocol stack 210 of the embodiment allows the UE to behave unambiguously when the precondition is not met or specifically, when the security mode has not been activated. In one example, the situation may occur when the RLC protocol 131 indicates that the transmission has failed after a predetermined number of re-transmission attempts has been reached (maximum number of re-transmission has been reached).

Figure 2:
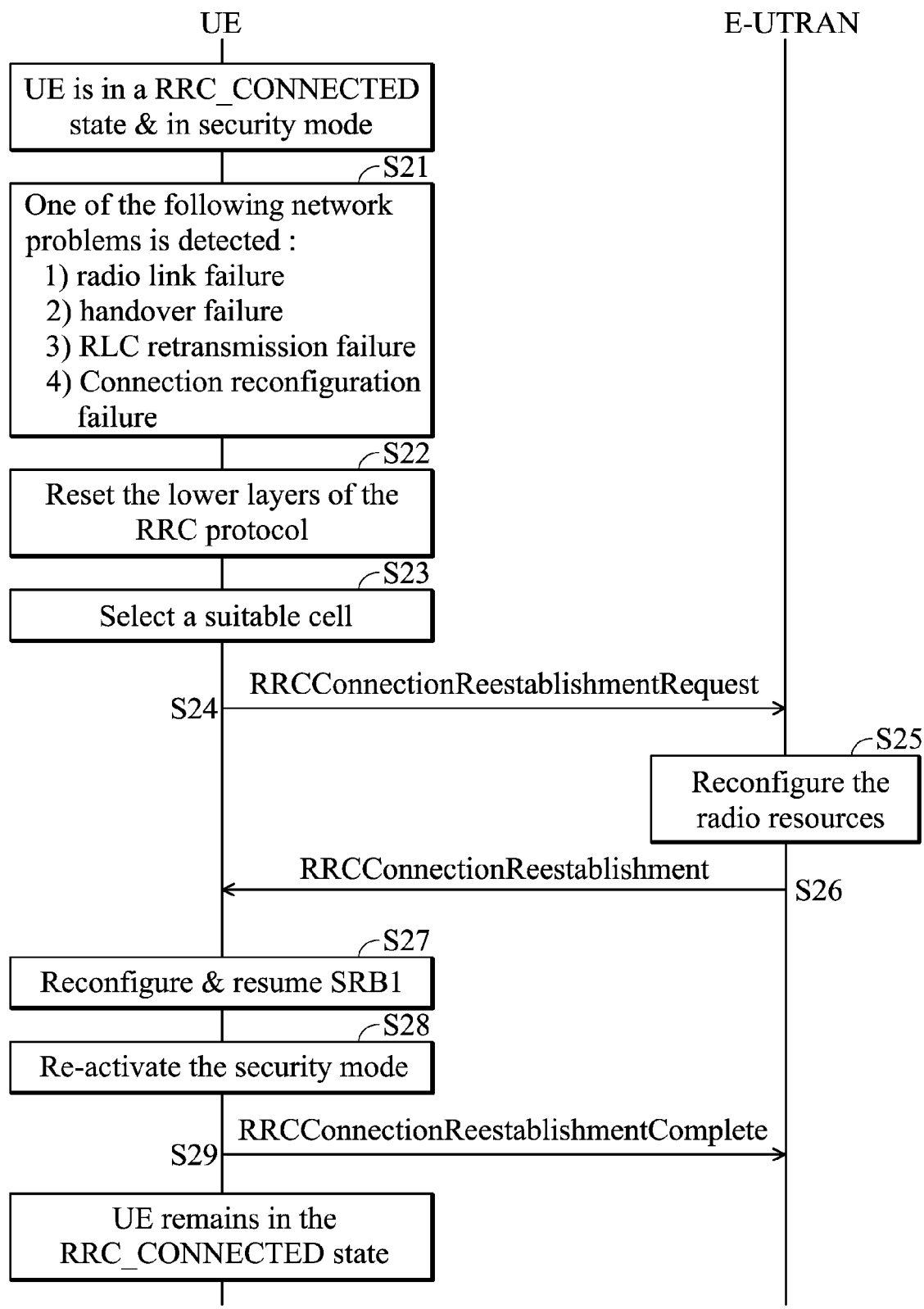
FIG. 2 is a message sequence chart illustrating the operation of the UE when the security mode has been activated, and the connection re-establishment request has been accepted.

FIG. 2 is a message sequence chart illustrating the operation of the UE when the security mode has been activated, and the connection re-establishment request has been accepted. Referring to FIG. 2, the initial state of the UE is a RRC_CONNECTED state and the UE is in security mode. In this specified state, RRC_CONNECTED state, the radio link is considered logically in a connection state by the RRC protocol stack 210. It may be called in other names in various embodiments. When the UE detects a network problem (step S21) representing that the connection is broken in an embodiment, it resets the lower layers of the RRC protocol (step S22), selects a suitable cell of the mobile communication system (step S23), and transmits a request message (RRCConnectionReestablishmentRequest) to the E-UTRAN (step S24) for re-establish the connection. The network problems encountered in step S21 include but not limited in the following failures such as radio link failure, handover failure, RLC retransmission failure, and connection reconfiguration failure. Upon receiving the request message, the E-UTRAN reconfigures the radio resources (step S25) and sends a configuration message (RRCConnectionReestablishment) to the UE (step S26) for provisioning a new connection. When the UE receives the configuration message, it reconfigures and resumes SRB1 (step S27) and re-activates the security mode (step S28). In an embodiment, the UE reconfigures and resumes a basic signaling bearer, not merely restrict referring to the specified SRB1. Then, the UE transmits a configuration complete message (RRCConnectionReestablishmentComplete) to the E-UTRAN (step S29) to acknowledge the completion. Thus, the connection is re-established and the UE remains in the RRC_CONNECTED state.

Figure 3:
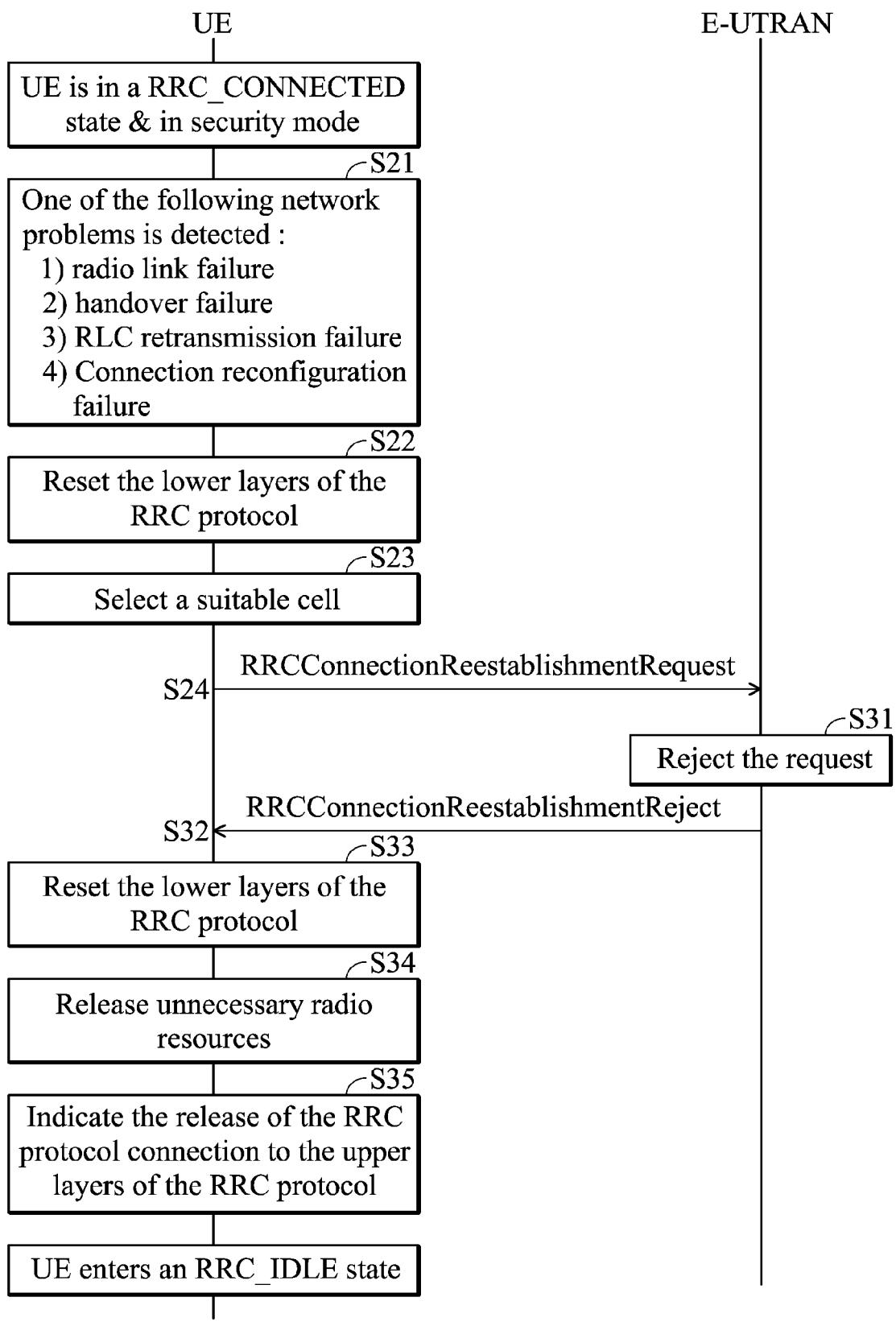
FIG. 3 is a message sequence chart illustrating the operation of the UE when the security mode has been activated, and the connection re-establishment request has been rejected.

FIG. 3 is a message sequence chart illustrating the operation of the UE when the security mode has been activated, and the connection re-establishment request has been rejected according to an embodiment of the present invention. Referring to FIG. 3, the initial state of the UE is a RRC_CONNECTED state and the UE is in security mode. Similar to FIG. 2, the UE first resets the lower layers of the RRC protocol, selects a suitable cell of the mobile communication system, and transmits a request message (RRCConnectionReestablishmentRequest) to the E-UTRAN when a network problem is detected. However, upon receiving the request message, the E-UTRAN rejects the request (step S31) and sends a rejection message (RRCConnectionReestablishmentReject) to the UE (step S32). The reason why the E-UTRAN rejects the request is not in the scope of this present invention. When the UE receives the rejection message, it performs the enter-idle-state actions which may comprise any combination of the followings: resetting the lower layers (step S33), releasing unnecessary radio resources (step S34), and indicating the release of the RRC protocol connection to the upper layers (step S35). Then, the UE enters a RRC_IDLE state and waits for the next trigger event. In other words, once receiving the rejection message (step S32) in one embodiment, the UE may release all resource occupied by the original connection and notify other layers in the protocol stack including some of those layers 110 and 130 shown in the FIG. 1.

Figure 4:
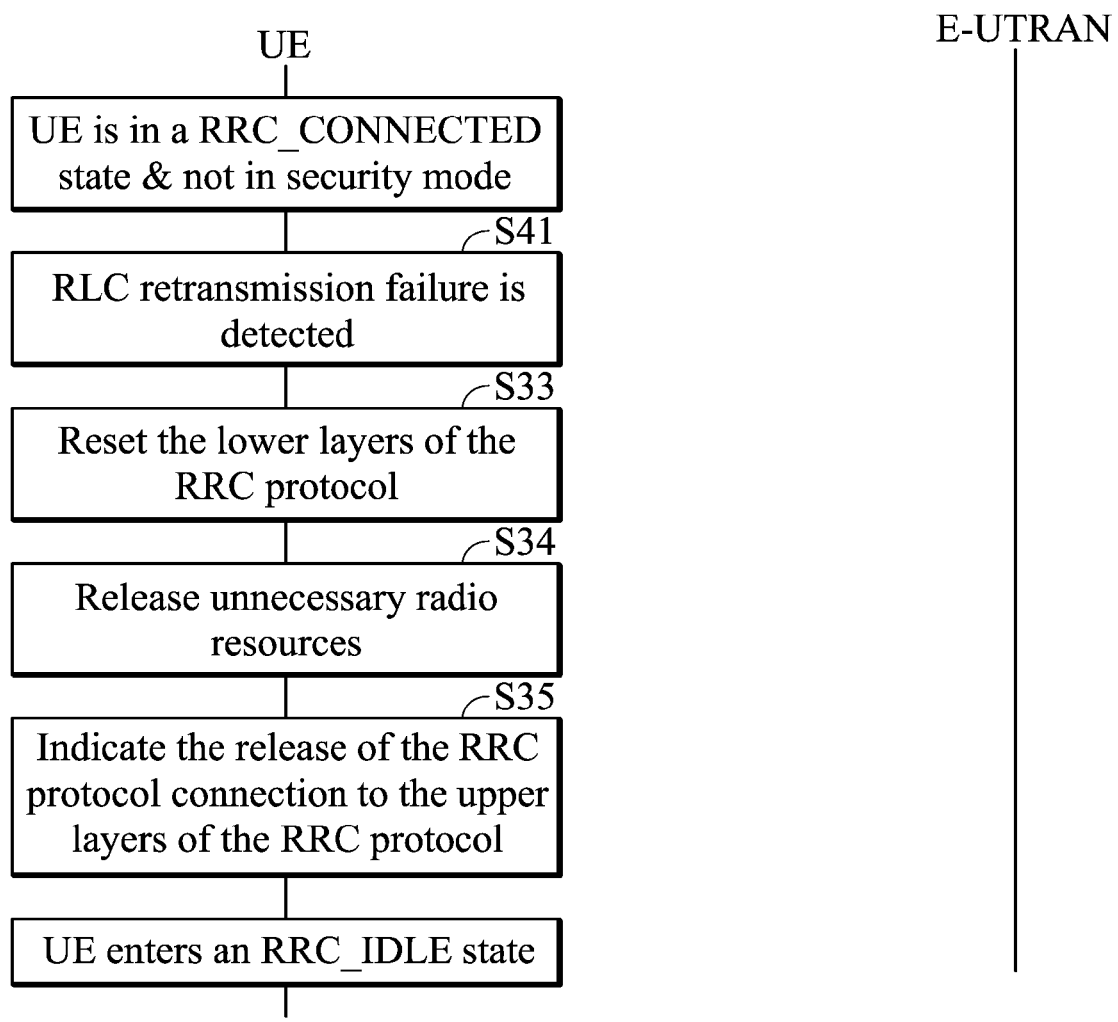
FIG. 4 is a message sequence chart illustrating the operation of the UE when the security mode has not been activated.

FIG. 4 is a message sequence chart illustrating the operation of the UE when the security mode has not been activated in accordance to an embodiment of the present invention. Referring to FIG. 4, the initial state of the UE is a RRC_CONNECTED state and the UE is not in security mode. When the UE detects a RLC re-transmission failure (step S41), it may perform the enter-idle-state actions as described in FIG. 3 or release all resource occupied by the original connection and notify other layers in the protocol stack including some of those layers 110 and 130 shown in the FIG. 1. Then, the UE enters the RRC_IDLE state and waits for the next trigger event.

Figure 5:
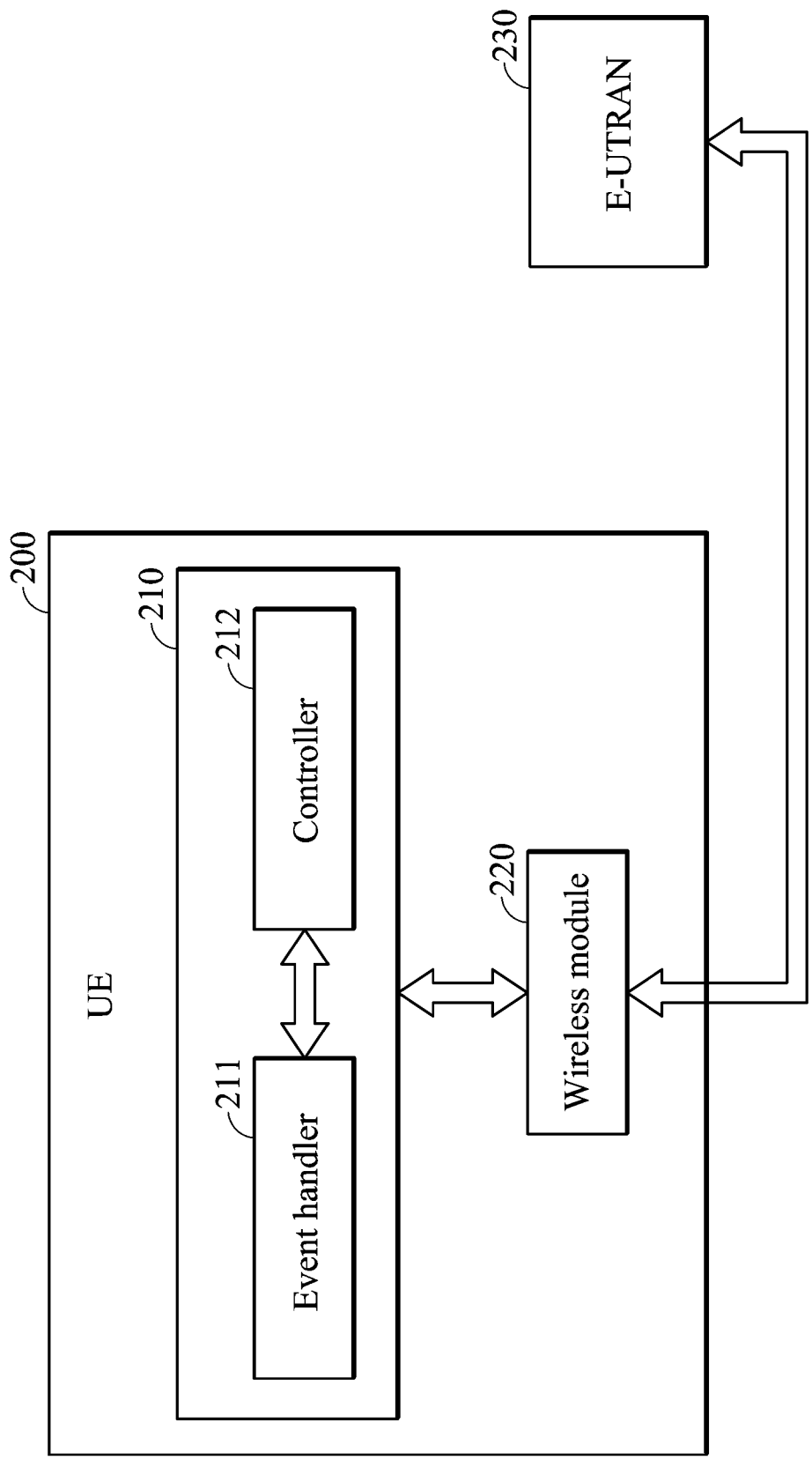
FIG. 5 is a block diagram illustrating in greater detail of the RRC protocol block shown in FIG. 1.

FIG. 5 is a block diagram illustrating in greater detail of the RRC protocol block shown in FIG. 1 in accordance of an embodiment of this present invention. A UE 200 has a wireless module 220 for receiving and transmitting messages propagated in radio frequency. The UE 200 also includes the RRC protocol stack 210 depicted in the FIG. 1, which is connected to receive and transmit messages from and to the E-UTRAN 230 via the wireless module 220. The connection between the RRC protocol stack 210 and the wireless module 220 may involve blocks that are not shown in FIG. 5, such as the protocol stack blocks of FIG. 1. The RRC protocol stack 210 comprises an event handler 211 and a controller 212, the operation of which is explained in more detail with reference to FIG. 6.

Figure 6:
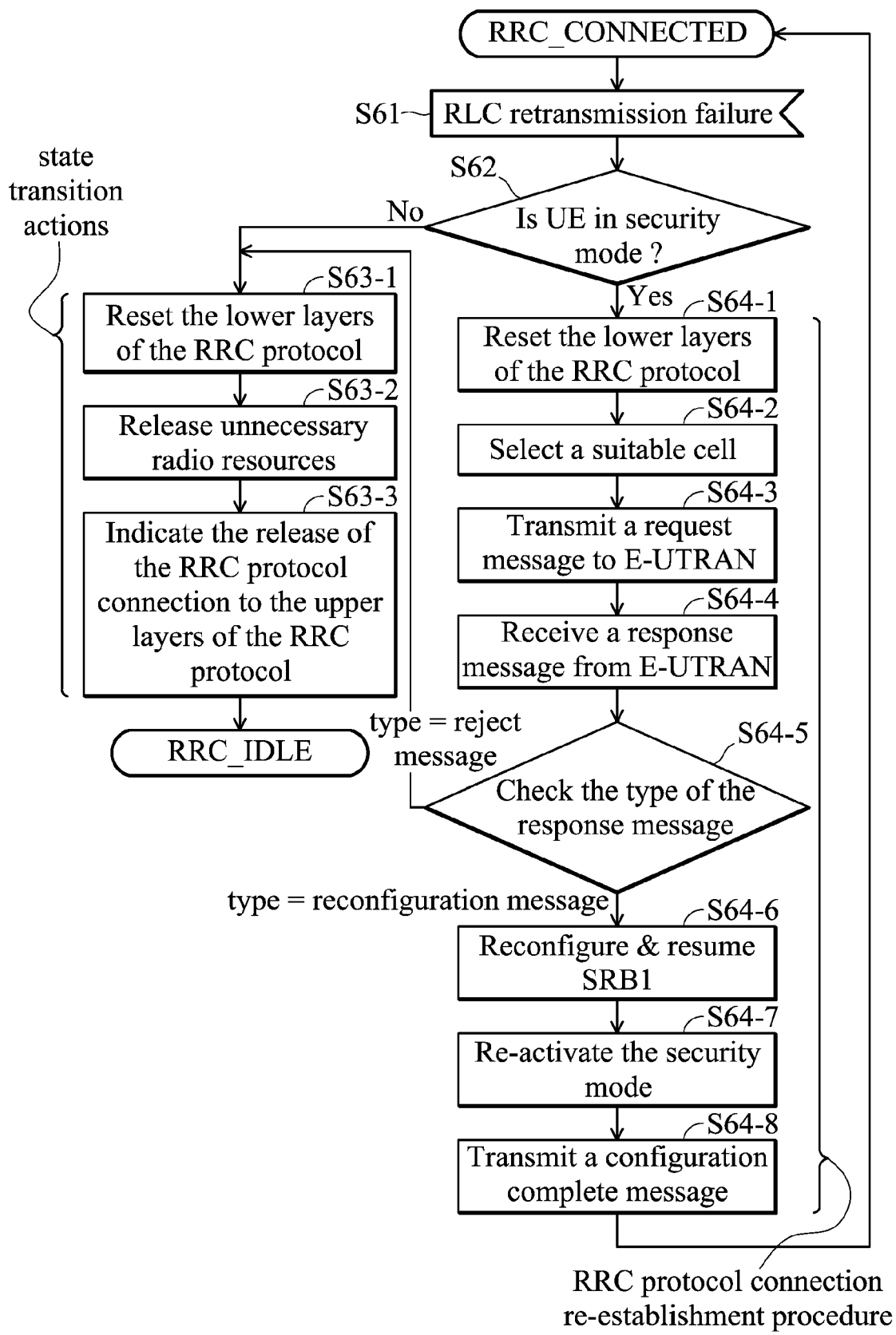
FIG. 6 is a flow diagram illustrating the operation of connection re-establishment in a RRC protocol stack 210.

FIG. 6 is a flow diagram illustrating the operation of connection re-establishment in a RRC protocol stack 210 in accordance of an embodiment of this present invention. Referring to FIG. 6, the initial state of the UE is a RRC_CONNECTED state. When the event handler 211 receives a trigger event indicating that re-transmission attempts in the RLC protocol has failed after a predetermined number of re-transmission attempts has been reached (step S61), the controller 212 checks to see if the UE is in security mode (step S62). If the UE is not in security mode, the controller 212 performs the enter-idle-state actions which comprise resetting the lower layers of the RRC protocol (step S63-1), releasing unnecessary radio resources (step S63-2), indicating the release of the RRC protocol connection to the upper layers of the RRC protocol (step S63-3), and entering a RRC_IDLE state. If the UE is in security mode, the controller 212 performs the RRC protocol connection re-establishment procedure. The RRC protocol connection re-establishment procedure comprises resetting the lower layers of the RRC protocol (step S64-1), selecting a suitable cell of the mobile communication system (step S64-2), and transmitting a request message (RRCConnectionReestablishmentRequest) to the E-UTRAN via the wireless module (step S64-3). The UE then receives a response message from the E-UTRAN via the wireless module 220 (step S64-4) and checks the type of the response message (step S64-5). If the response message is a configuration message (RRCConnectionReestablishment), the controller 212 reconfigures and resumes SRB1 (step S64-6) and then re-activates the security mode (step S64-7). Then, the controller 212 transmits a configuration complete message (RRCConnectionReestablishmentComplete) to the E-UTRAN via the wireless module 220 (step S64-8). Thus, the connection is re-established and the UE remains in the RRC_CONNECTED state. If the response message is a rejection message (RRCConnectionReestablishmentReject), the controller 212 performs the enter-idle-state actions as described above. Then, the UE enters the RRC_IDLE state and waits for the next trigger event.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A user equipment (UE), configured in a connected state with connection to a mobile communication system, comprising:
   a wireless module receiving and transmitting messages; and
   a controller determining whether the UE is in security mode in response to a radio link control (RLC) retransmission failure in contrast to a radio link failure, performing a radio resource control protocol (RRC) connection re-establishment procedure in response to a determination that the UE is in security mode when the RLC retransmission failure occurs, and performing enter-idle-state actions and moving the UE state from the connected state to an RRC idle state in response to a determination that the UE is not in security mode when the RLC retransmission failure occurs,
   wherein the RLC retransmission failure corresponds to an outward message transmission failure after a predetermined number of retransmission attempts.

2. The UE of claim 1, wherein the enter-idle-state actions comprise the following steps:
   resetting lower layers of an RRC protocol;
   releasing unnecessary radio resources; and
   indicating the release of the RRC protocol connection to upper layers of the RRC protocol.

3. The UE of claim 1, wherein the controller further performs a radio resource control protocol (RRC) connection re-establishment procedure in response of that the UE is determined in security mode.

4. The UE of claim 2, wherein the RRC protocol connection re-establishment procedure comprises the following steps:
   resetting lower layers of the RRC protocol;
   selecting a suitable cell of the mobile communication system;
   transmitting a request message to the mobile communication system; and
   receiving a response message in response to the request message,
   wherein in response to the response message is a configuration message, the UE further performs any combination of the following steps: resuming signaling radio bearer communication, re-activating the security mode, and initiating transmission of a configuration complete message, and wherein in response to the response message is a rejection message, the UE further performs any combination of the following steps: resetting the lower layers of the RRC protocol, releasing unnecessary radio resources, and indicating the release of the RRC protocol connection to upper layers of the RRC protocol.

5. The UE of claim 3, wherein in response to the RRC protocol connection re-establishment procedure is completed successfully, the UE remains in the connected state; otherwise, the UE enters the idle state.

6. A method for handling a radio link control (RLC) retransmission failure in a mobile communication system environment comprising a UE configured in a connected state to connect to a mobile communication system, the method comprising:
   determining whether the UE is in security mode in response to the RLC retransmission failure in contrast to a radio link failure, wherein the RLC retransmission failure corresponds to an outward message transmission failure after a predetermined number of retransmission attempts;
   performing a radio resource control protocol (RRC) connection re-establishment procedure in response to a determination that the UE is in security mode when the RLC retransmission failure occurs; and
   performing enter-idle-state actions and moving the UE state from the connected state to an RRC idle state in response to a determination that the UE is not in security mode when the RLC retransmission failure occurs.

7. The method of claim 6, wherein the enter-idle-state actions comprise the following steps:
   resetting lower layers of an RRC protocol;
   releasing unnecessary radio resources; and
   indicating the release of the RRC protocol connection to upper layers of the RRC protocol.

8. The method of claim 6, further comprising performing a radio resource control protocol (RRC) connection re-establishment procedure in response of that the UE is determined in security mode.

9. The method of claim 8, wherein the RRC protocol connection re-establishment procedure comprises the following steps:
   resetting lower layers of the RRC protocol;
   selecting a suitable cell of the mobile communication system;
   transmitting a request message to the mobile communication system; and
   receiving a response message in response to the request message.

10. The method of claim 9, wherein in response to the response message is a configuration message, the UE further performs the following steps:
    resuming signaling radio bearer communication;
    re-activating the security mode; and
    initiating transmission of a configuration complete message.

11. The method of claim 9, wherein in response to the response message is a rejection message, the UE further performs the following steps:
    resetting the lower layers of the RRC protocol;
    releasing unnecessary radio resources; and
    indicating the release of the RRC protocol connection to upper layers of the RRC protocol.

12. The method of claim 8, wherein in response to the RRC protocol connection re-establishment procedure is completed successfully, the UE remains in the connected state; otherwise, the user equipment enters the idle state.

13. A chipset, handling a radio link control (RLC) retransmission failure for a UE configured in a connected state with connection to a mobile communication system, comprising:
    a controller determining whether the chipset is in security mode in response to the RLC retransmission failure in contrast to a radio link failure, performing a radio resource control protocol (RRC) connection re-establishment procedure in response to a determination that the chipset is in security mode when the RLC retransmission failure occurs, and performing enter-idle-state actions and moving the chipset state from the connected state to an RRC idle state in response to a determination that the chipset is not in security mode when the RLC retransmission failure occurs,
    wherein the RLC retransmission failure corresponds to an outward message transmission failure after a predetermined number of retransmission attempts.

14. The chipset of claim 13, wherein the enter-idle-state actions comprise the following steps:
    resetting lower layers of an RRC protocol;
    releasing unnecessary radio resources; and
    indicating the release of the RRC protocol connection to upper layers of the RRC protocol.

15. The chipset of claim 13, wherein the mobile communication system is an Evolved Universal Terrestrial Radio Access (E-UTRA) system, the connected state is referred to a RRC_CONNECTED state defined in the E-UTRA system, and the idle state is referred to a RRC_IDLE state defined in the E-UTRA system.

16. The chipset of claim 13, wherein the controller further performs a radio resource control protocol (RRC) connection re-establishment procedure in response of that the chipset is determined in security mode.

17. The chipset of claim 16, wherein the RRC protocol connection re-establishment procedure comprises the following steps:
    resetting lower layers of the RRC protocol;
    selecting a suitable cell of the mobile communication system;
    transmitting a request message to the mobile communication system; and
    receiving a response message in response to the request message.

18. The chipset of claim 17, wherein in response to the response message is a configuration message, the chipset further performs the following steps:
    resuming signaling radio bearer communication;
    resuming signaling radio bearer communication;
    initiating transmission of a configuration complete message.

19. The chipset of claim 17, wherein in response to the response message is a rejection message, the chipset further performs the following steps:
    resetting the lower layers of the RRC protocol;
    releasing unnecessary radio resources; and
    indicating the release of the RRC protocol connection to upper layers of the RRC protocol.

20. The chipset of claim 16, wherein in response to the RRC protocol connection re-establishment procedure is completed successfully, the chipset remains in the connected state; otherwise, the chipset enters the idle state.

* * * * *